(12) United States Patent
Wieser et al.

(10) Patent No.: US 12,552,067 B2
(45) Date of Patent: Feb. 17, 2026

(54) SYSTEMS AND METHODS RELATED TO BOARD NOTCHING

(71) Applicants: Kevin W. Wieser, Shiocton, WI (US); Daniel P. Berken, Hortonville, WI (US)

(72) Inventors: Kevin W. Wieser, Shiocton, WI (US); Daniel P. Berken, Hortonville, WI (US)

( * ) Notice: Subject to any disclaimer, the term of this patent is extended or adjusted under 35 U.S.C. 154(b) by 326 days.

(21) Appl. No.: 18/309,195

(22) Filed: Apr. 28, 2023

(65) Prior Publication Data
US 2024/0359358 A1    Oct. 31, 2024

(51) Int. Cl.
*B27F 5/02*    (2006.01)
*B27C 7/00*    (2006.01)
*B27G 13/14*   (2006.01)

(52) U.S. Cl.
CPC ............... *B27F 5/02* (2013.01); *B27C 7/005* (2013.01); *B27G 13/14* (2013.01)

(58) Field of Classification Search
CPC .............. B27C 5/00; B27C 5/02; B27G 13/14
See application file for complete search history.

(56) References Cited

U.S. PATENT DOCUMENTS

| | | | | |
|---|---|---|---|---|
| 5,823,239 A | * | 10/1998 | Smith | B27C 5/02 144/204.2 |
| 7,044,694 B2 | * | 5/2006 | Lowder | B23C 3/126 409/218 |
| 7,971,611 B1 | * | 7/2011 | Wells | B27C 5/02 144/286.5 |
| 8,079,389 B2 | * | 12/2011 | Shepherd | B23Q 11/0046 144/286.5 |

* cited by examiner

*Primary Examiner* — Matthew Katcoff
(74) *Attorney, Agent, or Firm* — Smith Keane LLP (57) ABSTRACT

A notch cutter according to the present invention generally comprises a cutting head driven by a motor to cut a notch parallel to the wood grain of a board. The board is held in place by a board frame, while wood shavings are funneled away from the notch cutter through an exhaust. Pneumatic tubes may be used to facilitate linear movement of the cutting head and motor along guide rails. The motor and guide rails are protected by a casing that may include beams and a stabilizer.

13 Claims, 9 Drawing Sheets

SYSTEMS AND METHODS RELATED TO BOARD NOTCHING

BACKGROUND OF THE INVENTION

In industrial packing, shipping, and storage, few devices are as ubiquitous as wooden pallets. Heavy items may be placed on pallets to be transported, arranged, moved, and stored easily using a forklift or pallet jack. To utilize a forklift to move a pallet, tines (and/or tine extensions) of the forklift are inserted into a space between top and bottom deck boards of the pallet, allowing the pallet and any load it is carrying to be safely lifted and transported.

Many different types of pallets exist, offering advantages for different situations. Block pallets feature an upper deck (e.g., substantially parallel boards or single perforate or imperforate platform) supported by columns, which are usually designed to be able to be picked up by a forklift from one of four sides. Stringer pallets may offer more support than block pallets by using upright boards (i.e., stringers) to support the upper deck. This design usually only allows the stringer pallet to be picked up from two opposing sides (i.e. by forklift tines inserted between stringers), but some stringer pallets have stringer notches which allow the pallets to be picked up from any side. Double-face pallets may feature designs similar to the block or stringer pallets and are further built with top and bottom decks (which may be substantially similar or identical), which may be reversible, though stringers may be notched on only one side (such as the bottom side). Dual deck pallets are generally used for heavy-duty tasks and have a longer expected life than single-face pallets and have improved stringer stability. Double-wing pallets refer to pallets where the top deck and/or bottom deck length or width extends beyond the support column arrangement or stringer length, which provides additional support or stacking surface area.

Determining the type, size, and capacity of pallet that would work best for a singular business has a variety of factors, including: the type of product being transported and/or stored; the packaging dimensions of the product, the frequency of use, the shipping destination, the transportation costs, and the overall budget requirements. Pallets may also be made from a variety of materials, such as wood, metal, or plastic. Wooden pallets are most commonly used and offer a well-balanced pallet weight to support weight ratio, and cost/benefit value.

Heavier wooden pallets are generally made from pinewood, jungle wood, or recycled wood, while lighter wooden pallets may be made from plywood. In building pallets, it is often necessary to create notches in the wooden planks to meet the design specifications of the pallet type. For example, a four-way stringer pallet generally features notches cut into the three or more stringers arranged in a parallel pattern (e.g., orthogonal to deck boards). This design allows the forklift to pick up the pallet from any side, while maintaining the extra load support and stability provided by the stringers. In mass-manufacturing such pallets, these notches must be cut accurately and quickly, which led to the invention of notch-cutting machines.

Such machines generally feature a motorized cutting head and some kind of clamp or jig to hold boards in place while the notches are being cut. The cutting head may also come with various sized removable cutters, depending on the width of the notch needed for the given pallet design.

Many notch-cutting machine designs leave much to be desired in terms of efficiency, effectiveness, safety, and labor amount/time, especially when a particularly small number of stringers are to be notched at a time. It is difficult to balance these factors to create a machine that is relatively inexpensive and useful for everyone from full-time pallet manufacturing companies to individuals. Therefore, improved stringer notch-cutting machines would prove beneficial to the art.

SUMMARY OF THE INVENTION

Embodiments of systems and methods according to the present invention relate generally to machines for cutting notches in boards. More specifically, the present invention relates to a notch-cutting machine with a directly driven cutting head.

According to an aspect of a system according to the present invention, the apparatus includes a motor affixed to a mounting plate, a cutting head spaced from the motor, and a cutting table positioned between the motor and cutting head, the cutting head being directly driven by the motor.

According to an aspect of a system according to the present invention, the motor includes a protruding shaft and the cutting head includes a bit coupled to the shaft.

According to another aspect of a system according to the present invention, wherein the bit includes at least one knife.

According to still another aspect of a system according to the present invention, each knife further includes at least one carbide insert.

According to yet another aspect of a system according to the present invention, at least one knife is approximately 1" thick and at least one knife is approximately ½" thick.

According to a further aspect of a system according to the present invention, the cutting table includes an aperture.

According to a still further aspect of a system according to the present invention, the system further includes a protective casing substantially surrounding the motor and including a plurality of side panels, a first pair of rails arranged in parallel, each rail of the first pair of rails affixed to an opposite side panel of the protective casing to the other, a first pneumatic cylinder affixed to the mounting plate and cutting table, the first pneumatic cylinder configured to actuate a linear movement of the motor and cutting head, the linear movement defined by the aperture in the cutting table, and a board frame affixed to the cutting table and comprising a gap. The linear movement of the motor and cutting head causes the cutting head to pass through the gap in the board frame.

According to a still further aspect of a system according to the present invention, the mounting plate includes a first plurality of linear ball bearings and the linear movement of the motor and cutting head is accomplished by sliding the first plurality of linear ball bearings on the first pair of rails.

According to a still further aspect of a system according to the present invention, the board frame further includes a receptor configured to house the cutting head after it moves through the board frame gap, a board placement shelf, and a board stopper. The board placement shelf and board stopper are located at opposite ends of the board frame.

According to a still further aspect of a system according to the present invention, the board stopper is adjustable.

According to a still further aspect of a system according to the present invention, the system further includes a second pair of rails arranged in parallel, each rail affixed to the cutting table, a cover comprising a second plurality of linear ball bearings, and a second pneumatic cylinder affixed to the cover and the board frame, the second pneumatic cylinder configured to actuate a linear movement of the cover. The linear movement of the cover is accomplished by sliding the second plurality of linear ball bearings on the second pair of rails.

According to a still further aspect of a system according to the present invention, the system further includes at least two sets of controls.

According to a still further aspect of a system according to the present invention, a first set of the at least two sets of controls are configured to manage the operation of the motor.

According to a still further aspect of a system according to the present invention, a second set of the at least two sets of controls are configured to operate the first and second pneumatic cylinders.

According to a still further aspect of a system according to the present invention, the second set of controls include two push button controls. The first and second pneumatic cylinders are configured to operate only when the push button controls are engaged contemporaneously.

According to a still further aspect of a system according to the present invention, the system further includes an exhaust affixed to the cutting table.

An embodiment of a method for notching boards according to the present invention includes the steps of providing a board frame affixed to a cutting table, the board frame comprising a gap, directly driving a cutting head using a motor, placing a board within the board frame, and linearly moving the driven cutting head through the board frame gap to cut a notch in the board. The cutting head cuts the board parallel to the grain of the board.

According to an aspect of a method according to the present invention, the moving step further includes the steps of mounting the motor to a mounting plate, mechanically connecting a pneumatic tube to the mounting plate and the cutting table, and engaging the pneumatic tube to actuate the linear movement of the cutting head.

According to another aspect of a method according to the present invention, the engaging steps includes the step of pressing two buttons simultaneously.

According to still another aspect of a method according to the present invention, the method further includes the step of funneling wood shavings through an exhaust affixed to the cutting table.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
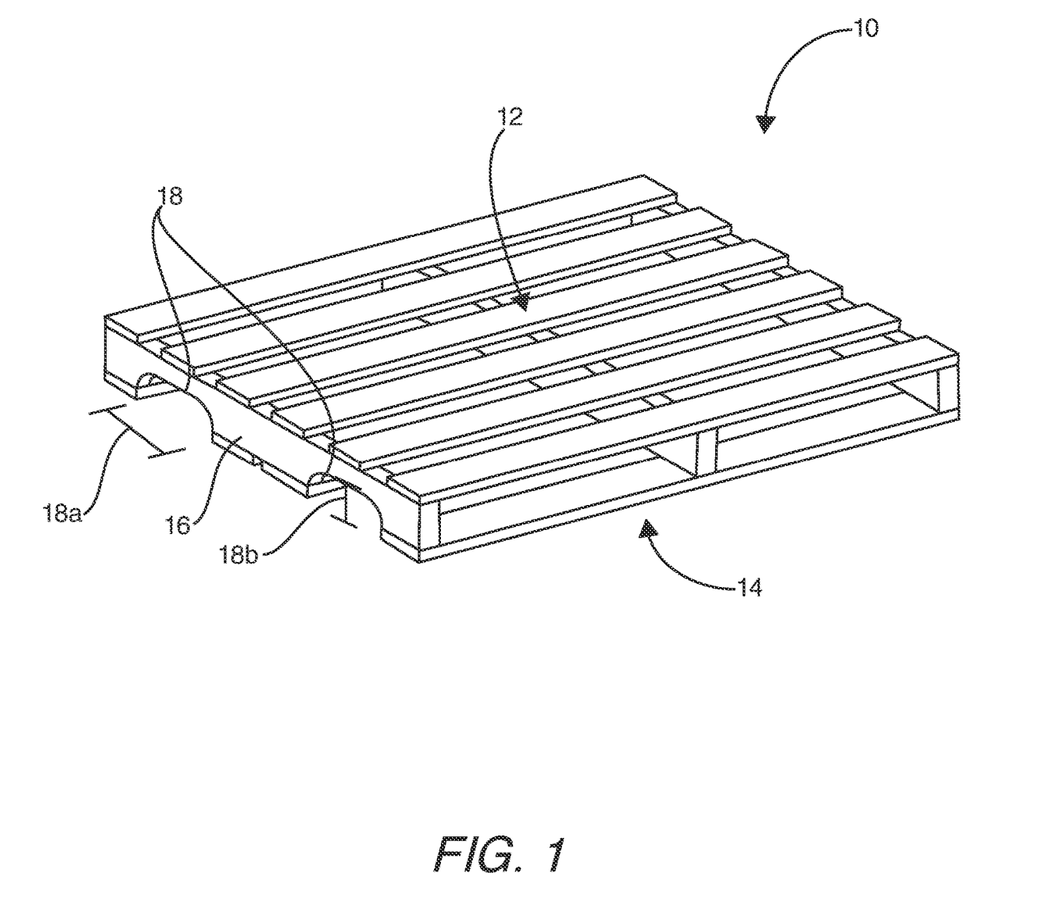
FIG. 1 is a perspective view of a stringer pallet known in the art.

Machines are more efficient to manual labor in creating notches 18 in boards (stringers) 16 when building wooden stringer pallets 10, such as the one shown in FIG. 1. These pallets 10 are important tools for transportation and storage. A stringer pallet 10 may be created by affixing a top deck 12 and, optionally, a bottom deck 14 to a group of spaced boards (stringers) 16. These stringers 16 may or may not include notches 18. The inclusion of notches 18 allows the pallet 10 to be picked up by a forklift when approached from any of at least three, and preferably four, orthogonal directions, rather than only two opposite directions which is common in using non-notched stringer pallets. The notch 18 generally includes a notch width 18a and a notch height 18b, each of which may vary, depending on the size of the pallet 10 and desired weight limit.

Figure 2:
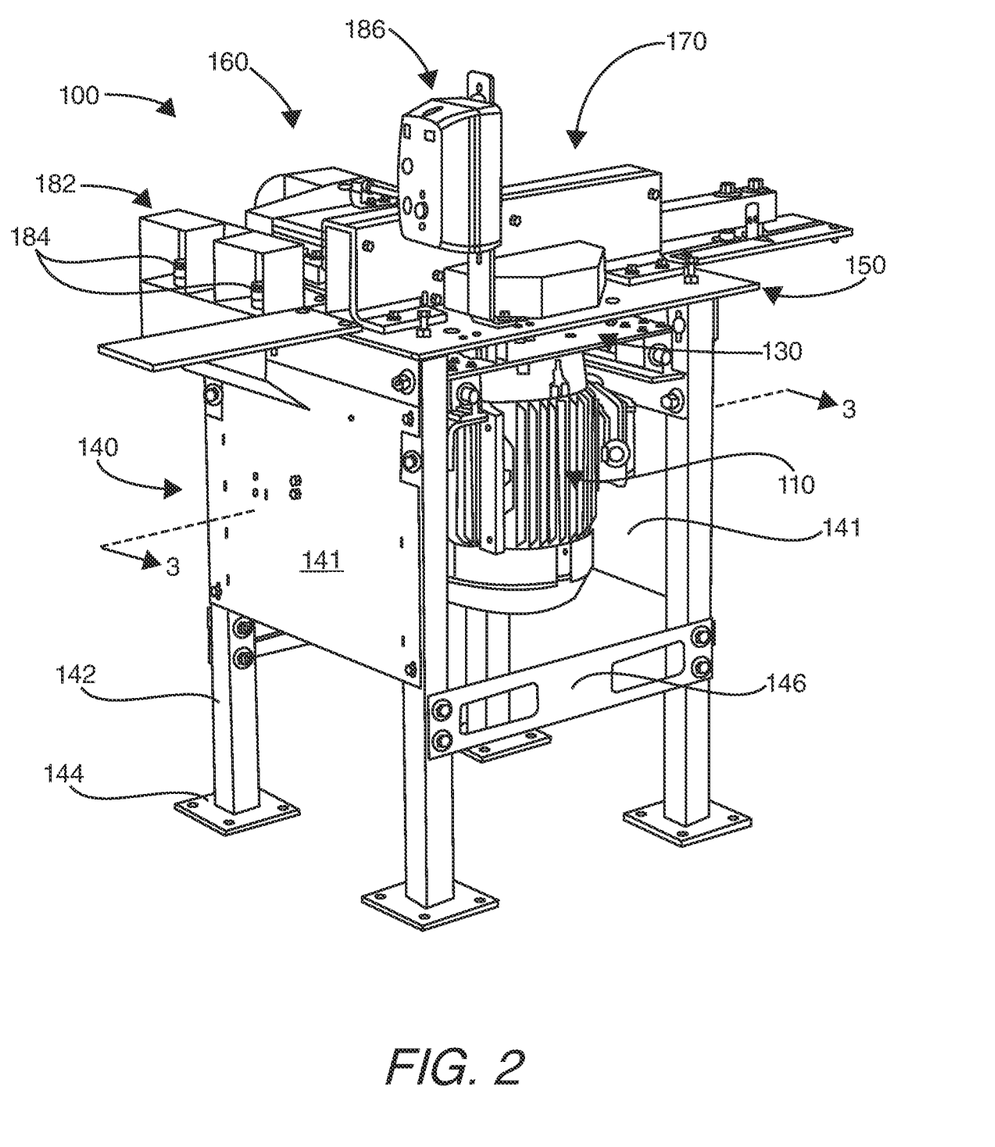
FIG. 2 is a perspective view of an embodiment of a notch cutter according to the present invention.
Figure 3:
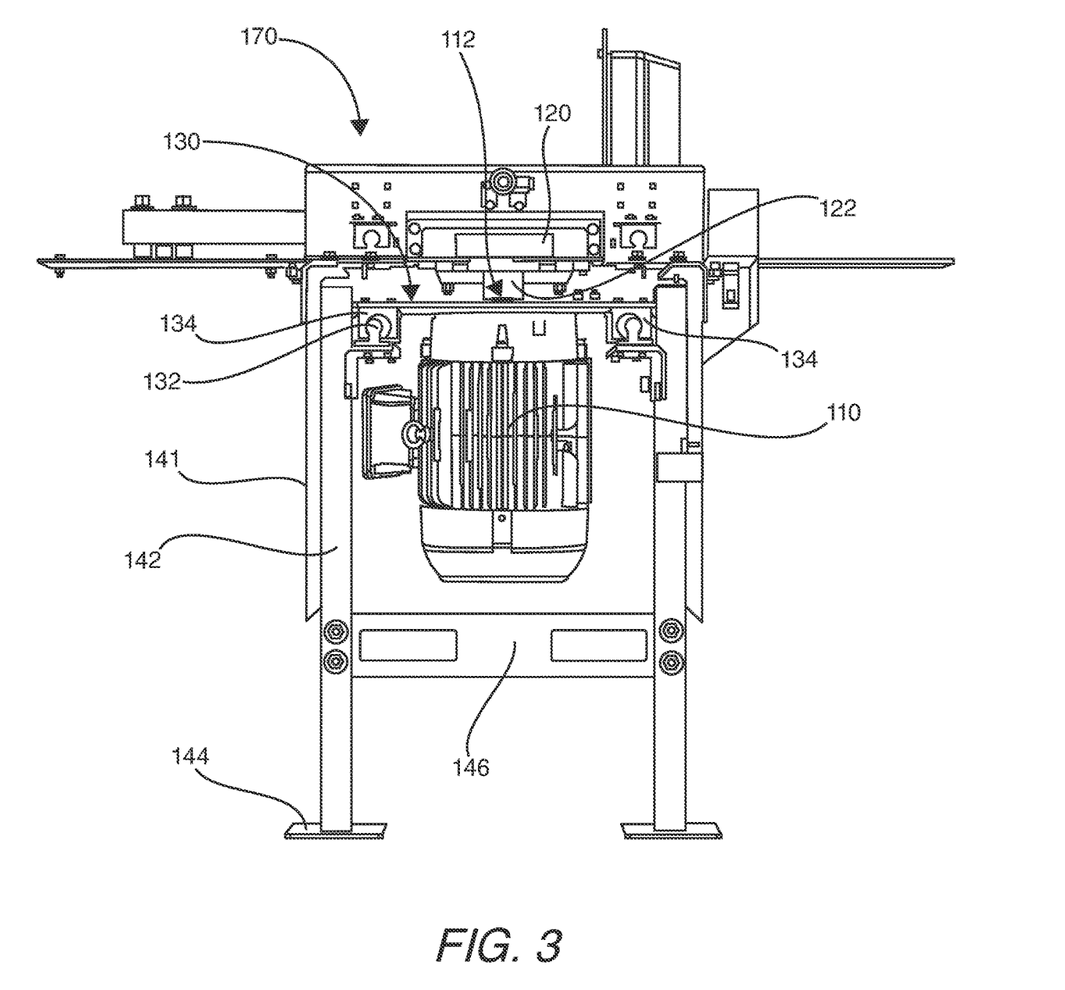
FIG. 3 is a cross-section view of the embodiment of the notch cutter of FIG. 2, taken along the line 3-3 of FIG. 2.

Turning now to the Figures, systems and methods related to board notching can be more particularly described. FIGS. 2 and 3 provide a notch cutter 100 according to the present invention, having a motor 110, which drives a cutting head 120, the motor being secured to a mounting plate 130 and protected by a shroud 140. The motor 110 and cutting head 120 preferably travel along a linear path defined generally parallel to the mounting plate 130 and an overlaying cutting table 150. A board frame 170 is positioned at one end of the cutting table 150, while a shavings exhaust 160 is placed at the other end to collect and transfer wood shavings away from the notch cutter 100. Finally, a series of controls 184-186 are mounted at various positions on the notch cutter 100, allowing the notch cutter 100 to be operated safely.

In using the notch cutter 100, a board 16 may be placed within the board frame 170. When the correct controls 184-186 are engaged, the cutting head 120, driven by the motor 110, moves toward and through the board 16, cutting a notch 18 with a width 18a and height 18b corresponding to the cutting head 120 diameter and size, respectively. The position on the board 16 at which the notch 18 will be cut may be adjusted using the board frame 170. The notch cutter 100 according to the present invention offers a quick and efficient way to mass produce notched boards to be used in building stringer pallets. The notch cutter 100 is effective on both softwoods (such as pine, cedar, and rosewood) and hardwoods (such as ash, maple, and oak).

Figure 4:
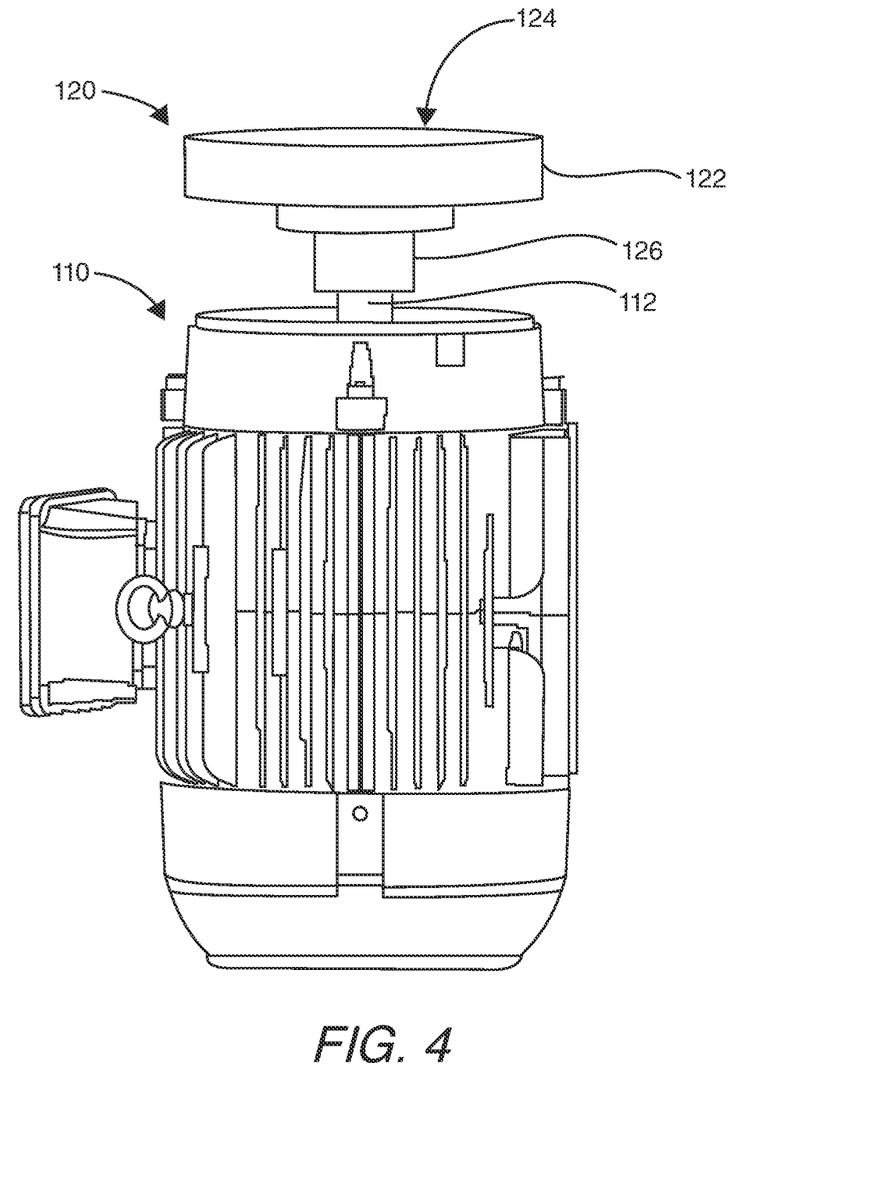
FIG. 4 is a front view of a motor and cutting head according to the present invention.

As can be seen in FIG. 4, notches 18 are made in a board 16 by the cutting head 120 spaced from the motor 110 by a shaft 112. The motor 110 is preferably an electric motor having between 5 and 20 horsepower, but even more preferably about 10 horsepower. Protruding from the motor 110 is a shaft 112, on which the cutting head 120 may be directly mounted, preferably through an adapter hub fastened to both the shaft 112 and the cutting head 120, although embodiments wherein the cutting head 120 is mounted directly to the shaft 112 are also contemplated. In past arrangements of notch cutters, the cutting head has been indirectly connected to the motor and driven using a drive belt. Having the cutting head 120 directly mounted onto the motor 110 saves space and negates the need for the belt.

The cutting head 120 preferably comprises a bit 122 connecting with a casing 126. The casing 126 is fastened directly to the motor shaft 112 to keep the cutting head 120 in place during use. Affixed to the bit 122 are the knives 124 (not shown) of various sizing and number, preferably having at least one knife that is approximately 1" thick and at least one knife that is approximately ½" thick. The knives 124 also preferably comprise replaceable carbide inserts, which provide extremely clean cuts. In use, the cutting head 120 is directly driven by the motor 110 to spin and the knives 124 are pushed against the board 16 to cut a parallel notch 18 in one pass. The knives 124 cut with the grain of the board 16, preferably creating an approximately 1.5" tall and 9" wide cut, corresponding to the notch height 18b and notch width 18a, respectively. The notch height 18b may be varied by using different sized knives 124 in the cutting head 120 and the notch width 18a may be varied by using cutting heads of different diameters.

Figure 5:
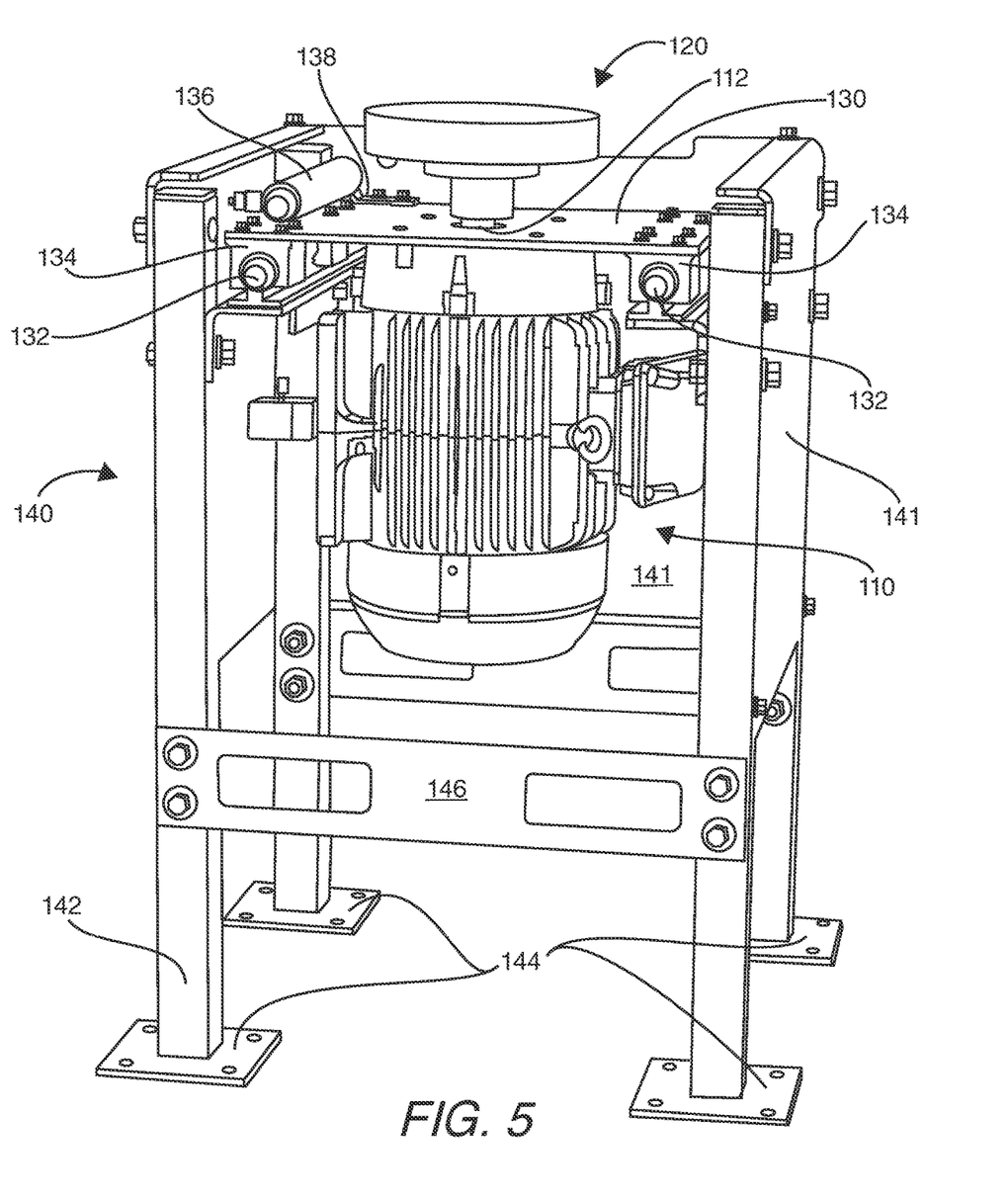
FIG. 5 is a perspective view of the motor and cutting head of FIG. 4 installed onto a mounting plate and surrounded by a protective casing according to the present invention.

When installed, the motor 110 is bolted onto a substantially flat metal mounting plate 130 and arranged between two parallel slide rails 132, as can be seen in FIG. 5. The motor shaft 112 extends through the mounting plate 130, such that the mounting plate 130 is situated between the motor 110 and the cutting head 120. The mounting plate 130 further comprises a plurality of linear ball bearings 134, one of which is preferably coupled to each corner of the mounting plate 130. The linear ball bearings 134 slide on the parallel slide rails 132, allowing the mounting plate 130, and the motor 110 and cutting head 120 by extension, to move linearly along the slide rails 132.

The linear movement of the mounting plate 130 is actuated by a pneumatic cylinder 136. The pneumatic cylinder 136 may be one well known in the art and commercially available. This arrangement eliminates labor in physically moving the motor, promotes worker safety, and allows for variable speeds in introducing the cutting head 120 to the board 16. Depending on the type of wood (hardwood or softwood), a quicker or slower movement of the cutting head 120 is required. The pneumatic cylinder 136 is preferably coupled to the motor mounting plate 130, and thus facilitates the movement of the motor 110 and cutting head 120, through a connecting bracket 138.

Surrounding the motor 110 is a protective casing 140 comprising a plurality of preferably removable side panels 141 bolted to beams 142, as seen in FIG. 5. Although three side panels 141 are seen in FIG. 5, there are preferably four side panels 141 bolted to preferably four beams 142. The side panels 141 are preferably substantially square pieces of sheet metal, each affixed to two steel beams 142. Each beam 142 also preferably comprises a base 144 that may be bolted or otherwise coupled to the floor to provide stability for the notch cutter 100. Further stability may be provided by one or more stabilizers 146, which may be affixed between beams 142. The motor mounting plate slide rails 132 are each preferably indirectly coupled to a side panel 141 (through a bracket or some other similar means) to allow the linear ball bearings 134 to slide on the rails 132. The slide rails 132 are preferably affixed to opposing side panels 141 to allow the mounting plate 130 and motor 110 to linearly travel.

Figure 6:
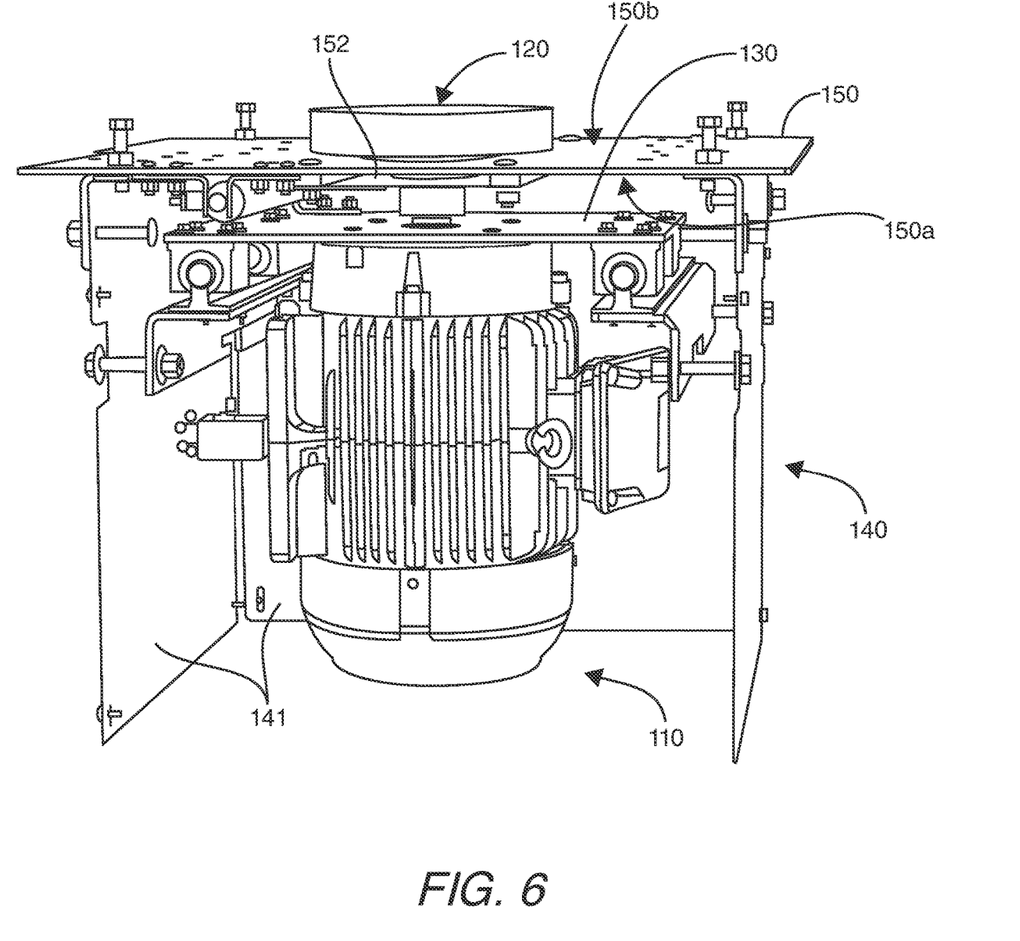
FIG. 6 is a perspective view of the arrangement of FIG. 5 further comprising a cutting table and sans beams and stabilizers according to the present invention.
Figure 7:
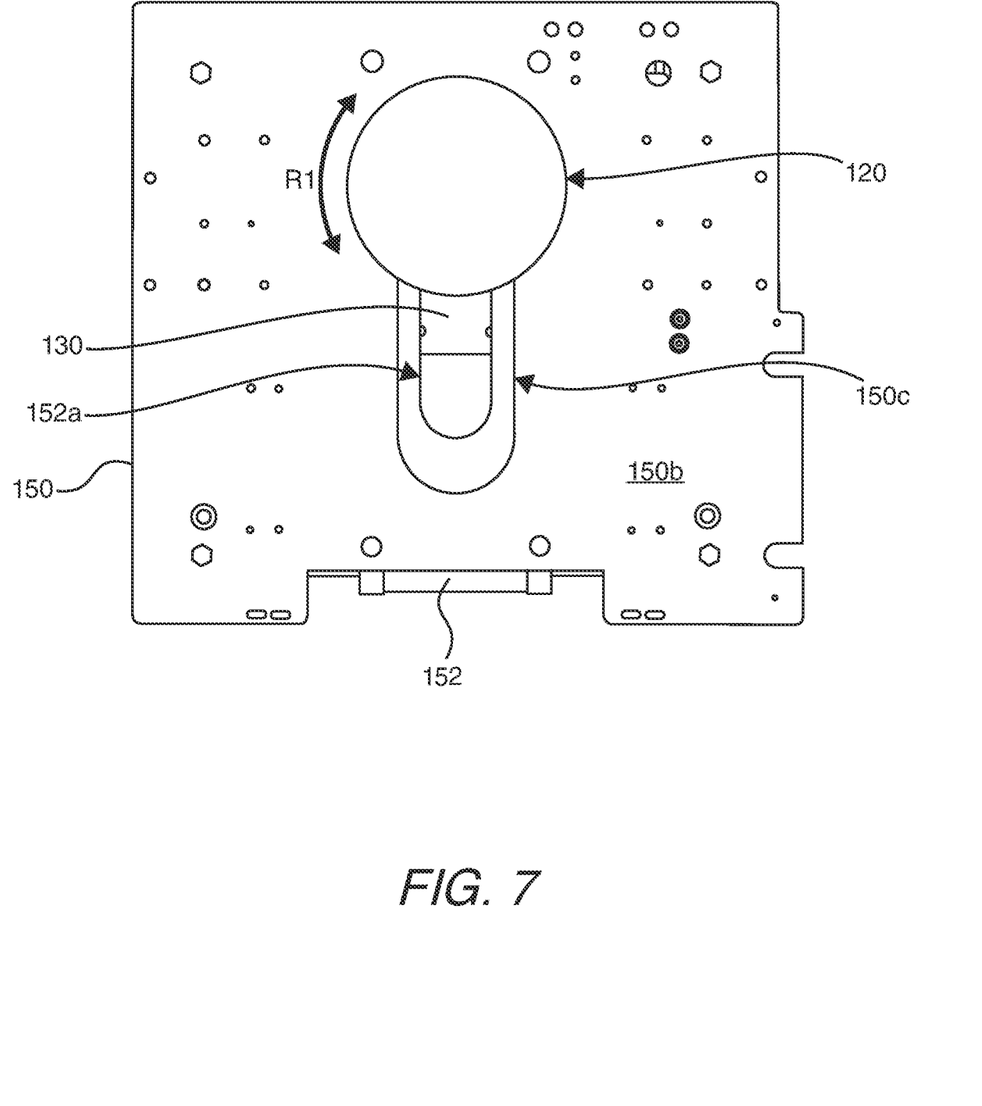
FIG. 7 is a top plan view of the cutting table of FIG. 6.

Situated above, and parallel to, the motor mounting plate 130 is the cutting table 150. This substantially flat, rectangular sheet of metal provides a surface on which many other components of the notch cutter 100 are affixed. For instance, attached to the bottom surface 150a of the cutting table 150 is a cutting head guide 152. This rectangular piece comprises an elongated oval cutout 152a. The motor shaft 112 extends through this cutout 152a, and the cutting table 150 as well, similar to the motor mounting plate 130. The oval cutout 152a is oriented with its long sides parallel to the motor mounting plate slide rails 132, allowing the cutting head guide 152 to limit the movement of the motor shaft 112 and cutting head 120 to the desired linear direction. A pair of brackets 138 also affix the motor mounting plate pneumatic cylinder 136 to the cutting table bottom surface 150a.

Similar to the cutting head guide 152, the cutting table 150 comprises a cutter head track 150c in the form of an elongated oval cutout orientated parallel to the linear travel path of the motor 110 and cutting head 120. Since the motor shaft 112 extends all the way through the cutting table 150, the cutting head 120 is positioned just above the top surface 150b of the cutting table 150 and rotates in a direction R1 parallel to the top surface 150b.

Figure 8:
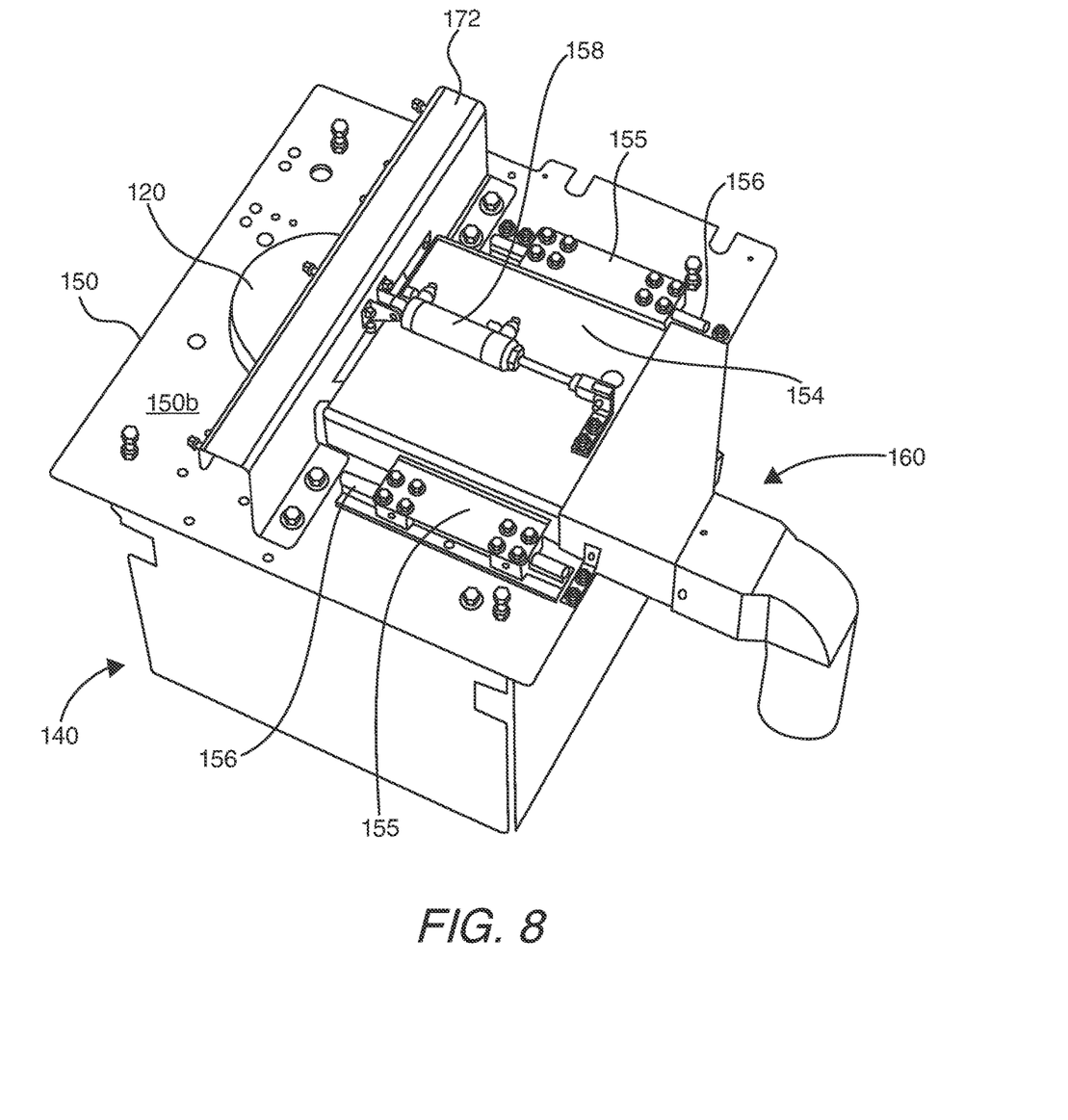
FIG. 8 is a perspective view of the cutting table of FIGS. 6 and 7 further comprising a cover and shavings exhaust according to the present invention.

Also positioned above the cutting table top surface 150b is a cover 154 affixed to linear ball bearings 155 that slide on a pair of slide rails 156 bolted to the cutting table 150. These cutting table slide rails 156 are parallel in orientation to each other and to the motor mounting plate slide rails 132 situated below the cutting table 150. The cover 154 is preferably a cuboid shape having two long sides formed integrally with a top plate and two open ends which allow the cutting head 120 and wood shavings to exit.

The cover 154 preferably surrounds the cutting head 120 until it is engaged and moves to begin cutting a notch 18 into a board 16. However, the cover 154 may also linearly travel along the slide rails 156 to expose the cutting head 120 for maintenance and switching out of cutting head knives 124 and/or carbide inserts 128. Further, a small amount of linear movement of the cover 154 may be actuated by a pneumatic cylinder 158 during the notch cutting process in a similar action to the linear travel of the motor mounting plate 130. However, the movement of the cover 154 is much more limited and intended only to prevent wood shavings from the board 16 from escaping the cover 154.

The cover 154 also serves to funnel the wood shavings into the shavings exhaust 160 affixed to one end of the cutting table 150 opposite the board frame 170. The shavings exhaust 160 is preferably a duct leading away from the notch cutter 100. It may further include a vacuum and/or tubing to clear wood shavings even more efficiently.

Figure 9:
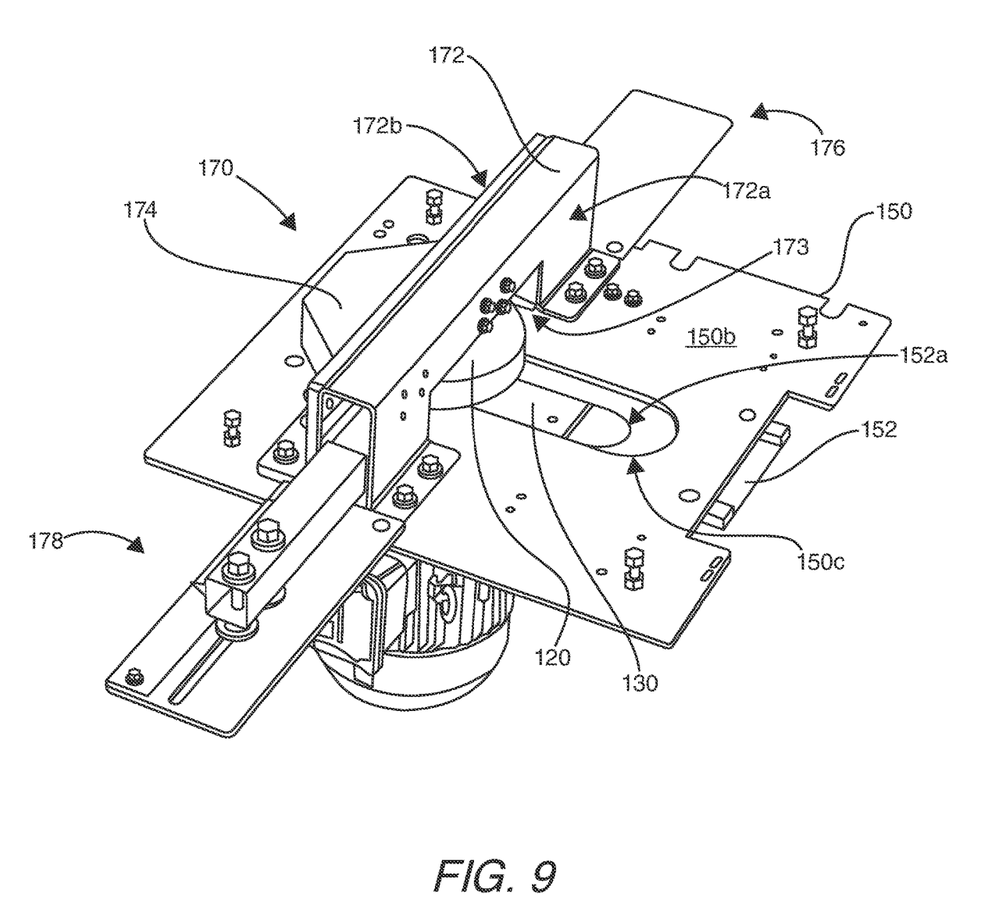
FIG. 9 is a perspective view of the cutting table of FIGS. 6 and 7 further comprising a board frame according to the present invention.

As seen in FIG. 9, the board frame 170 is preferably positioned opposite the shavings exhaust 160, which serves to hold a board 16 in place while a notch 18 is being cut. The board frame 170 comprises a board sleeve 172 having front 172a and back 172b sections, wherein the sleeve 172 is sandwiched between a board placement shelf 176 and an adjustable board stopper 178. The sleeve front 172a is generally cuboid, having open ends and a gap 173 which allows the cutting head 120 to access the board 16 while it is held in place by the board frame 170. The sleeve front 172a is affixed to both the cutting table 150 and the sleeve back 172b.

The sleeve back 172b is preferably a rectangular metal piece comprising a protruding enclosed receptor 174. When the cutting head 120 cuts through a board 16 to create a notch 18, the cutting head 120 continues traveling in a linear direction all the way through the board and into the receptor 174 to ensure a complete notch cut. The receptor 174 prevents the outside environment from interacting with the cutting head 120, which promotes worker safety and also prevent unnecessary wear to the cutting head knives 124.

After passing through the board 16 and into the receptor 174, the cutting head 120 is withdrawn back into its original position beneath the cover 154 and the newly notched board 16 may be removed from the board frame 170.

Located at one end of the board frame sleeve 172 is the board placement shelf 176. The shelf 176 is preferably orientated parallel to the cutting table 150 and one end of the shelf 176 is bolted to the cutting table 150. The purpose of the shelf 176 is to allow easier loading of a board 16 into the sleeve 172. One end of the board 16 may be placed upright on its side on the shelf 176 and slid into the side opening of the sleeve 172. One the opposite end of the sleeve 172 is the board stopper 178, which prevents the board 16 from sliding further through the sleeve 172. The board stopper 178 is preferably adjustable to account for boards 16 of different lengths.

Boards 16 are preferably loaded manually into the board frame 170 and preferably loaded one at a time to prevent breakdown. However, other configurations are also contemplated. For example, boards may be loaded and unloaded into the board frame 170 automatically using a board loader. A plurality of boards 16 may also be loaded at once for thinner and/or softer wood boards.

Finally, a series of controls are used to safely operate the various moving aspects of the notch cutter 100 as seen in comprehensive FIG. 2. The motor controls 186 allow a user to start the motor 110 and possibly pick a rotation speed for the cutting head 120. A button encasing 182 is also bolted to the cutting table 150 and houses a pair of engagement buttons 184. The engagement buttons 184 operate the pneumatic cylinders 136-158, beginning the process of the cutting head 120 conducting its linear movement defined by the cutting head guide 152 to cut through the board 16, creating a notch 18, and ending its movement in the enclosed receptor 174 attached to the board frame sleeve 172. To increase safety, both of the buttons 184 must be pressed simultaneously for the pneumatic cylinders 136-158 to operate, which means both the user's hands must be on the buttons 184 and away from the machine. Further, the button encasing 182 protects the user's hands from outside forces while the notch cutter 100 is in operation. When the engagement buttons 184 are released, the pneumatic cylinders 136-158 disengage and the cutting head 120, along with the attached motor 110 and mounting plate 130, moves back to its resting position beneath the cover 154.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A system for cutting notches in wooden boards, the system comprising:
    a motor affixed to a mounting plate;
    a cutting head spaced from and directly driven by the motor; and
    a cutting table positioned between the motor and cutting head, the cutting table comprising an aperture;
    a protective casing substantially surrounding the motor and comprising a plurality of side panels;
    a first pair of rails arranged in parallel, each rail of the first pair of rails affixed to an opposite side panel of the protective casing to the other;
    a first pneumatic cylinder affixed to the mounting plate and cutting table, the first pneumatic cylinder configured to actuate a linear movement of the motor and cutting head, the linear movement defined by the aperture in the cutting table; and
    a board frame affixed to the cutting table and comprising a gap,
    wherein the linear movement of the motor and cutting head causes the cutting head to pass through the gap in the board frame.

2. The system of claim 1, wherein the mounting plate comprises a first plurality of linear ball bearings and the linear movement of the motor and cutting head is accomplished by sliding the first plurality of linear ball bearings on the first pair of rails.

3. The system of claim 2, the board frame further comprising:
    a receptor configured to house the cutting head after it moves through the board frame gap;
    a board placement shelf; and
    a board stopper,
    wherein the board placement shelf and board stopper are located at opposite ends of the board frame.

4. The system of claim 3, wherein the board stopper is adjustable.

5. The system of claim 4, further comprising:
    a second pair of rails arranged in parallel, each rail affixed to the cutting table;
    a cover comprising a second plurality of linear ball bearings; and
    a second pneumatic cylinder affixed to the cover and the board frame, the second pneumatic cylinder configured to actuate a linear movement of the cover,
    wherein the linear movement of the cover is accomplished by sliding the second plurality of linear ball bearings on the second pair of rails.

6. The system of claim 5, further comprising at least two sets of controls.

7. The system of claim 6, wherein a first set of the at least two sets of controls are configured to manage the operation of the motor.

8. The system of claim 7, wherein a second set of the at least two sets of controls are configured to operate the first and second pneumatic cylinders.

9. The system of claim 8, wherein the second set of controls comprise two push button controls and wherein the first and second pneumatic cylinders are configured to operate only when the push button controls are engaged contemporaneously.

10. The system of claim 9, the system further comprising an exhaust affixed to the cutting table.

11. A method for notching boards comprising the steps of:
    providing a board frame affixed to a cutting table, the board frame comprising a gap;
    directly driving a cutting head using a motor;
    placing a board within the board frame; and
    linearly moving the driven cutting head through the board frame gap to cut a notch in the board, the moving step comprising the steps of:
        mounting the motor to a mounting plate;
        mechanically connecting a pneumatic tube to the mounting plate and the cutting table; and
        engaging the pneumatic tube to actuate the linear movement of the cutting head,
    wherein the cutting head cuts the board parallel to the grain of the board.

12. The method of claim 11, the engaging step comprising the step of pressing two control buttons simultaneously.

13. The method of claim 12, further comprising the step of funneling wood shavings through an exhaust affixed to the cutting table.

* * * * *